United States Patent [19]

Roger

[11] Patent Number: 4,757,672
[45] Date of Patent: Jul. 19, 1988

[54] MOWER CONDITIONER WITH DOUBLE WINDROWING ATTACHMENT

[75] Inventor: Andre Roger, Alencon, France

[73] Assignee: Deere & Company, Moline, Ill.

[21] Appl. No.: 461,330

[22] Filed: Jan. 26, 1983

[30] Foreign Application Priority Data

Jan. 29, 1982 [FR] France ............................ 82 01416

[51] Int. Cl.⁴ ............................................ A01D 43/02
[52] U.S. Cl. ........................................ 56/192; 56/377
[58] Field of Search ..................... 56/3, 4, 13.5, 14.5, 56/192, 365, 366, 370, 371, 377, 400

[56] References Cited

U.S. PATENT DOCUMENTS

| 2,511,841 | 6/1950 | Gaterman . | |
|---|---|---|---|
| 3,896,613 | 7/1975 | Van der Lely | 56/370 |
| 4,037,390 | 7/1977 | Vogelenzang | 56/192 |
| 4,128,987 | 12/1978 | Zweeger | 56/370 |
| 4,392,339 | 7/1983 | Berlivot et al. | 56/192 |
| 4,397,135 | 8/1983 | Wattron | 56/366 |

FOREIGN PATENT DOCUMENTS

| 1933726 | 7/1969 | Fed. Rep. of Germany . | |
|---|---|---|---|
| 2306687 | 8/1974 | Fed. Rep. of Germany | 56/370 |
| 2448546 | 10/1974 | Fed. Rep. of Germany . | |
| 2448500 | 4/1975 | Fed. Rep. of Germany . | |
| 2157600 | 10/1972 | France . | |
| 2375814 | 7/1978 | France . | |
| 2483736 | 6/1980 | France . | |
| 2484189 | 6/1980 | France . | |
| 6705524 | 10/1968 | Netherlands . | |
| 482386 | of 0000 | Switzerland . | |
| 480776 | 12/1969 | Switzerland . | |
| 1174728 | 12/1969 | United Kingdom . | |
| 1435277 | 5/1976 | United Kingdom . | |
| 1444282 | 7/1976 | United Kingdom . | |
| 1501707 | 2/1978 | United Kingdom . | |
| 1531187 | 11/1978 | United Kingdom . | |
| 1386631 | 3/1979 | United Kingdom . | |
| 2023393 | 1/1980 | United Kingdom . | |
| 2065436 | 7/1981 | United Kingdom | 56/192 |

Primary Examiner—John Weiss

[57] ABSTRACT

To form a double windrow of a grass crop after it has been cut, a windrow grouper is mounted behind a mower conditioner unit. The windrow grouper has an upright rotating drum which is provided with crop-engaging tines, and is positioned to deflect the cut crop into the double windrow when the crop is still in flight from the mower conditioner unit and before it has any substantial contact with the ground. The windrow grouper is swung clear of the crop delivered by the mower conditioner unit to enable an initial windrow to be laid, and then is swung back into the flight path of the crop to form the double windrow.

8 Claims, 2 Drawing Sheets

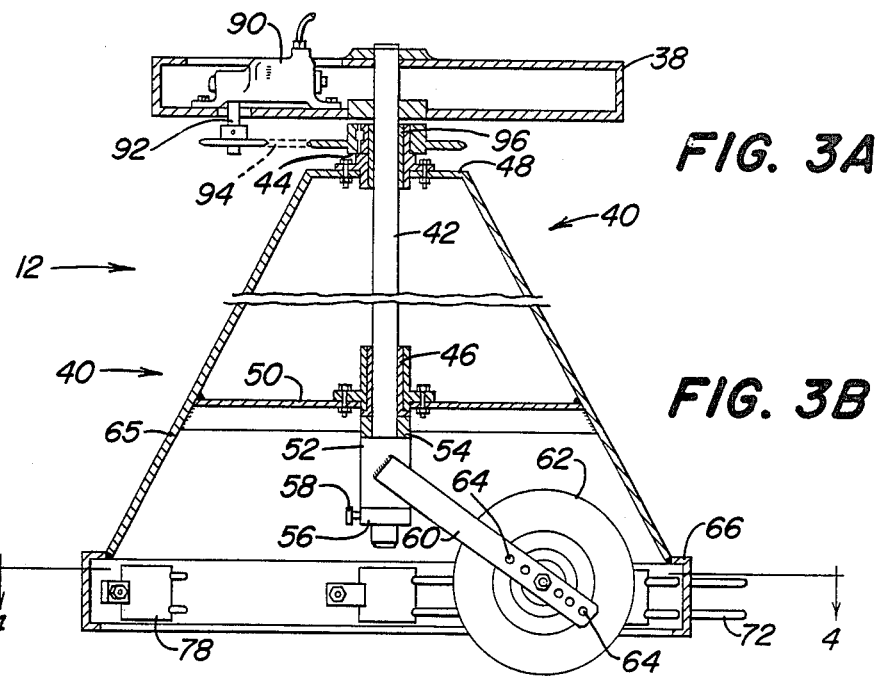
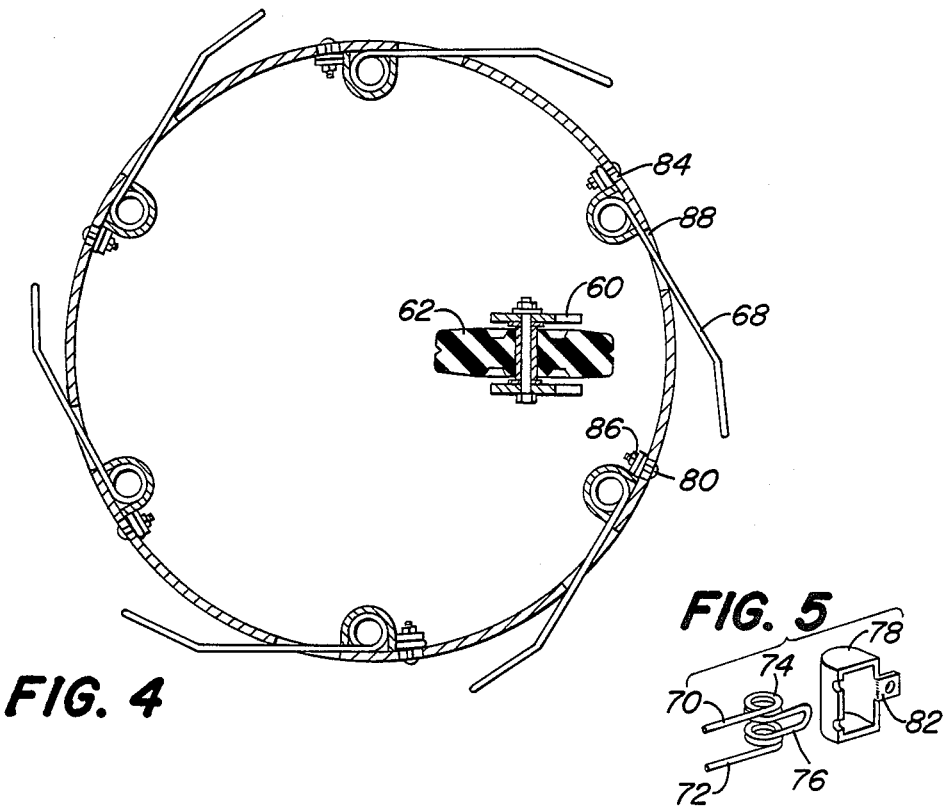

MOWER CONDITIONER WITH DOUBLE WINDROWING ATTACHMENT

BACKGROUND OF THE INVENTION

This invention relates to a crop harvesting machine which has a windrow grouper to which harvested crop is delivered and which rotates about an upwardly extending axis. The machine can be a mower conditioner for a grass crop. A windrow grouper is a component which combines into one, at least two windrows each of which is made on a single pass of the harvesting machine.

Conventionally, grass to be harvested is cut by a mower and delivered rearwardly to form a windrow on the ground, where it is left for a period to dry. A further machine then is used to pick the crop up from the windrow.

Some years ago, it was proposed in Swiss patent specification No. 480,776 to form a double windrow on every second pass of a mower across a field by providing the mower at its rearward part with a windrow grouper which functions on the second pass only and which rakes the crop across the ground from the second windrow just formed into the previous windrow. Subsequently, the crop lying in the double windrow thus produced is picked up in half the number of the passes which would have been needed had the crop been distributed in single rather than double windrows. The rake disclosed in the Swiss patent specification is rotatable about a horizontal or vertical axis.

One difficulty with such an arrangement is that foreign bodies and other rubbish such as stones would tend to be raked with the crop from the second windrow into the double windrow. These foreign bodies clearly present a mechanical danger to machinery used to pick up the double windrow and also a health hazard to cattle which may be fed on the harvested crop.

SUMMARY OF THE INVENTION

According to the present invention, a harvester is comprised of a harvesting unit for moving through a field, removing (e.g. cutting) crop from the ground and propelling said crop rearwardly of the unit and a windrow grouper for combining crop exiting from the unit into a previously formed windrow. The windrow grouper is disposed relative to the unit so that it deflects the crop in flight before it has substantial contact with the ground. Thus, the windrow grouper of the present machine is in the delivery path of the crop rather than merely in a position to work on crop which has already been deposited on the ground. In this way, the crop is conveyed largely above the ground and not on it. Hence there is less likelihood of the transfer of foreign bodies to the double windrow along with the crop. The invention in various aspects is defined in the appended claims.

BRIEF DESCRIPTION OF THE DRAWINGS

FIGS. 3A and 3B are fragmentary views, partly in vertical cross section, of the windrow grouper taken along lines 3A—3A and 3B—3B, respectively of FIG. 2.

FIG. 4 is a view of transverse cross section of the grouper along the line 4—4 of FIG. 3.

FIG. 5 is a perspective exploded view of a tine-locating and -retaining housing with a portion of a tine of the windrow grouper.

DESCRIPTION OF THE PREFERRED EMBODIMENT

Figure 1:
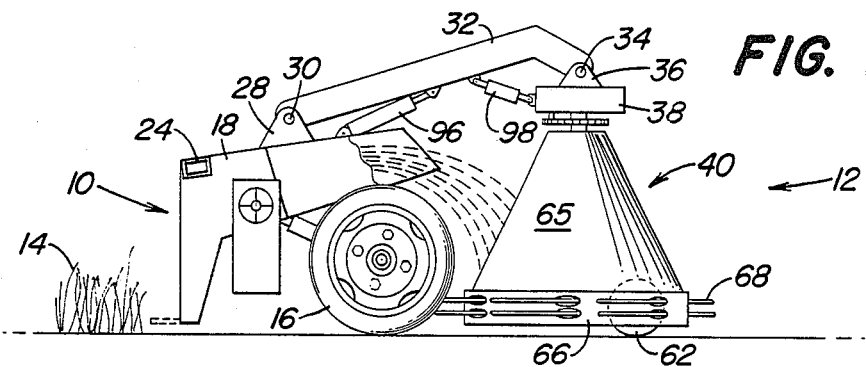
FIG. 1 is a side elevational view of a preferred embodiment of a crop harvester of the invention embodied in the form of a mower-conditioner having a windrow grouper. The windrow grouper is shown in its operative position.
Figure 2:
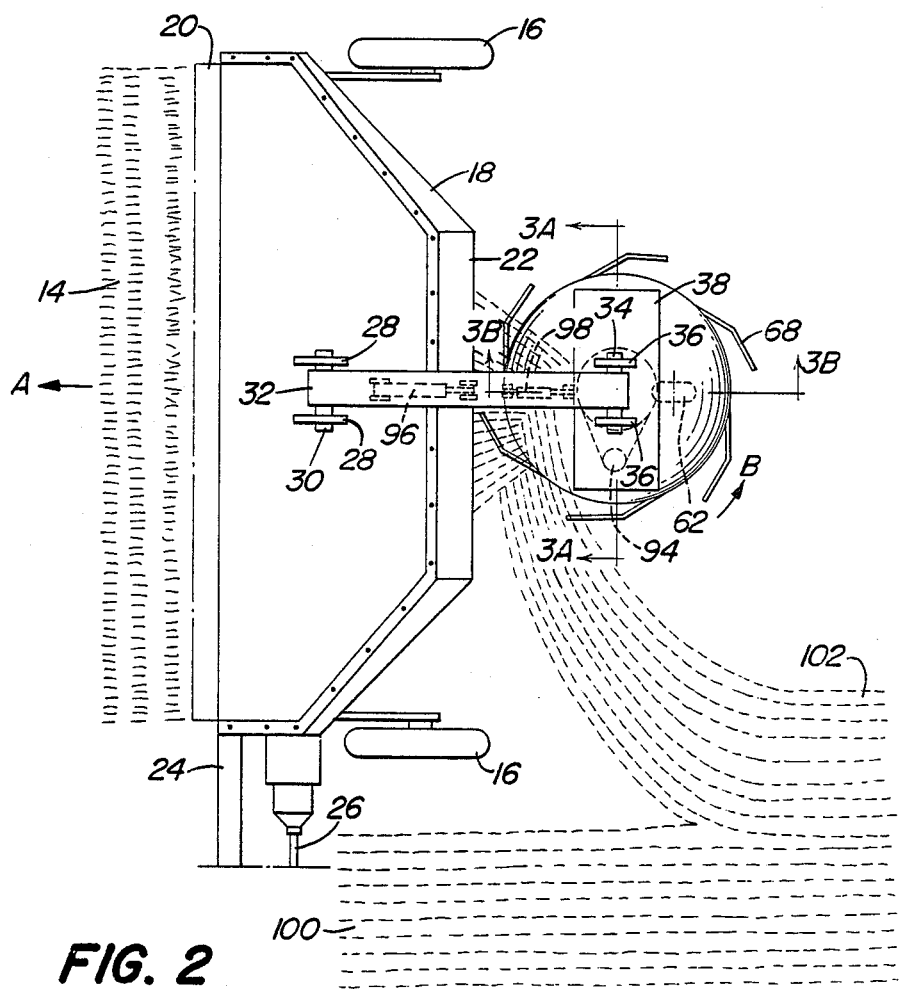
FIG. 2 is a plan view of the harvester of FIG. 1.

Reference is now made to FIGS. 1 and 2 which show a mower conditioner in accordance with a preferred embodiment of a harvesting machine of this invention. The mower conditioner comprises a forward mowing and conditioning unit 10 and a rearward windrow grouper 12. The mower conditioner is shown being drawn in the direction of arrow A by a tractor (not shown) through a crop of grass 14 to be harvested.

Since the mowing and conditioning unit 10 is of conventional type, it will not be described in any detail. Generally, unit 10 has a pair of wheels 16 which support a hooded frame 18. Frame 18 is provided at its front with a transverse reciprocating-knife type of cutterbar 20 (or a drum- or disc-type cutterbar), houses a conditioner (the details of which are not shown) behind the cutterbar 20 and has a narrow discharge outlet 22 which is substantially centered between the wheels 16. In conventional use, the crop is delivered from outlet 22 at a level approximately above the wheels 16 into a windrow. The mower conditioner unit 10 is connected to the tractor by way of a bar arrangement 24, and drive for it is supplied through a shaft 26.

The top of the hooded frame 18 carries a pair of laterally spaced lugs 28 which are connected by a pivot shaft 30 to the front end of a support beam 32 which is swingable upwardly and downwardly about pivot 30. Beam 32 extends rearwardly in a longitudinal direction with respect to unit 10 and supports at its other end the windrow grouper 12 on a pivot shaft 34 extending through a pair of lugs 36. The lugs are welded to the upper surface of a box frame 38.

Referring to FIGS. 3-5, frame 38 carries a rotatable drum 40 on a rigid downwardly extending shaft 42. Shaft 42 is welded to the upper and lower sides of frame 38 and is journalled in upper and lower bearings 44, 46 mounted on the top 48 of the drum and on an internal rigid horizontal (as viewed in FIG. 3B) plate 50, respectively, which is secured to the wall of the drum 40. Shaft 42 extends beyond the lower bearing 46 and is received within a free-turning sleeve 52 spaced from the bearing 46 by an intermediate ring 54. Sleeve 52 is maintained on shaft 42 by a detachable locking ring 56 immediately below it on shaft 42. Ring 56 is made fast with the shaft 42 by a screw 58. The sleeve 52 is welded to a pair of downwardly and rearwardly extending struts 60 between which a drum supporting wheel 62 is mounted within the confines of the drum 40. The wheel is thus free to orient itself as it progresses along the ground. The wheel position is adjustable along the struts 60 in that it can be unbolted and re-mounted at various locations 64. The wheel contacts the ground when the grouper 12 is operative (as in FIG. 1) and so the clearance of the drum 40 from the ground is determined by the location of the wheel 62.

The drum 40 includes a frusto-conical upper portion 65 and a cylindrical skirt 66 at the base of portion 65. Mounted to and projecting outwardly from the skirt 66 are aggressive crop-engaging members here shown in the form of six flexible tines 68 spaced equally around its periphery. In more detail, each tine is made of a single length of spring steel rod formed as two arms 70, 72 (shown broken away in FIG. 5) each with a spring 74 wound at its inner end portion and a slotted part 76 therebetween. Each pair of springs 74 is received within a retaining housing 78 located on the inner face of the skirt 66 by a bolt 80 passing through a lug 82 of the housing and through a short slot 84 in the skirt and receiving a nut 86. The slotted part 76 of each tine is fixed in position in that it is sandwiched between the lug 82 and the skirt 66 with the bolt 80 extending through it. The tines 68 run outwardly through slots 88 in the skirt 66 in a direction opposite to that of the rotation of drum 40 as indicated by an arrow B in FIG. 2 and are bent at their outer end portions toward the skirt 66.

The angle of the tines 68 in relation to the skirt 66 is adjustable by movement of the bolts 80 along their corresponding slots 84, and this alters the displacement of the crop as is explained below. Another advantage of the arrangement is that on breakage of a tine, the tine will tend to remain attached to the skirt 66. This is because in practice, rupture generally occurs in such a manner that each spring 74 stays integral with a corresponding arm 70 or 72 and each spring 74 will, of course, continue to be retained in its housing 72 even though severed from its companion spring.

The power unit for driving or spinning the drum 40 about the axis of the shaft 42 is a hydraulic motor 90 which is housed in the box frame 38 and which has an output shaft 92 extending downwardly from it. The power is transmitted from the shaft 92 by a sprocket and chain drive 94 to an outer sleeve 96 receiving the upper bearing 44 and rigidly secured to the top 48 of the drum 40. The hydraulic motor 90 is operated from the tractor.

Finally, means by which the position of the drum is altered will be described. As mentioned above, the support beam 32 is swingable upwardly and downwardly. This is achieved by means of a main piston and cylinder unit 96 (shown in FIG. 1). The cylinder of unit 96 is connected to the hooded frame 18 of unit 10 and the piston is connected to the underside of the beam 32. A turnbuckle 98 (or an adjustment piston and cylinder unit) is similarly connected between the leading side of the box frame 38 and the underside of the beam 32. The main piston and cylinder unit 96 serves to raise and lower the windrow grouper 12 between its operative position in FIG. 1 and an inoperative position (not shown) at which the windrow grouper is held aloft above the level of the discharge outlet 22 so that it is clear of the crop emerging from the mowing and conditioning unit. The turnbuckle 98 is used to alter the angle of the axis of the drum 40 with respect to the ground.

The harvester is used for the first pass across a grass crop with the windrow grouper 12 in the inoperative position. In unit 10, the crop is first cut from the ground, then passed through or engaged by a conditioning mechanism (not shown) and finally propelled rearwardly from the outlet 22. The cut grass leaving outlet 22 then simply falls undeflected back onto the ground into a first windrow 100 (FIG. 2).

At the beginning of the second pass the harvesting unit 10 is positioned to travel parallel to the first windrow 100, with the latter being located outside one of the wheels 16. The windrow grouper 12 is lowered by operation of the piston and cylinder unit 96 to its operative position, as shown in FIG. 1, at which the wheel 62 contacts the ground. Any angular adjustment of the axis of the drum 40 which may be desirable due to the crop and/or terrain is then made using the turnbuckle 98. Such adjustment will, of course, change the angle of the tines 68 with respect to the ground. In particular position in FIG. 1 of the drum, the tines 68 are approximately parallel to the ground. Furthermore, the angle at which the tines 68 extend outwardly from the drum is adjusted as described above to ensure that the crop is displaced correctly.

During the second pass the drum 40 is rotated by the hydraulic motor 90. The drum 40 is now in the delivery path of the crop and the crop contacts, as indicated in FIG. 1, initially the smooth side of the drum 40 and then the tines 68 of the drum 40. With the drum 40 including the tines 68 having a major transverse dimension approximating that of the discharge outlet 22, the overall result is that instead of falling directly onto the ground to form a second windrow parallel to the first, the crop is deflected and impelled toward the first windrow 100, thereby forming a composite or double windrow 102. Until the crop reaches the double windrow it does not contact the ground or at most, contacts the ground only minimally and most importantly, the tines 68 are well clear of the ground so that there is minimal risk of their raking foreign bodies from the ground into the double windrow 102.

At the next pass of the harvester, the windrow grouper 12 is again put into its inoperative raised position so that a new windrow is formed which will become a double windrow during the next pass when the windrow grouper 12 is lowered and operative. This procedure is repeated across the field.

Once the grass in the double windrows has dried sufficiently, another machine is employed to pick the crop up. Clearly the number of passes necessary to do this is half that of the mower conditioner.

Many modifications can be made to the harvester, but some may be mentioned specifically.

If desired, the skirt 66 can take a frusto-conical form. Alternatively, the drum upper portion 65 can, for example, be cylindrical or polygonal in cross section rather than frusto-conical. The skirt 66 would then respectively have a cylindrical or frusto-conical form or would be correspondingly polygonal in cross section. Thus the drum can be pyramidal. The drum 40 can be made without a skirt 66 and, in this event, can be provided with tines at its base portion.

The wheel 62 can be replaced by a skid for the sake of economy.

The housing 78 can be replaced by a single bridge member which passes through the springs 74 of a tine 68.

The windrow grouper 12 could be arranged to be pivoted about a longitudinal (fore-and-aft) axis or an upwardly extending axis between the operative and inoperative positions.

I claim:

1. In a crop harvesting machine including a unit for moving through a field, removing a crop from the ground and propelling said crop rearwardly of said unit along an airborne path and a windrow grouper mounted to said unit for swinging vertically between a raised position away from said path and a lowered position in said path for combining crop exiting from said unit into a previously formed windrow, the improvement wherein said grouper comprises a top defined by a frame; a support shaft depending from said frame along an upwardly extending axis; a drum mounted to said shaft for rotation thereabout and being located in the airborne path of crop exiting from said unit when the grouper is in its lowered position; a drive means coupled for rotating said drum and a plurality of crop-engaging elements mounted on and extending outwardly from said drum and cooperating with said drum to deflect the airborne crop before the crop has substantial contact with the ground.

2. The machine of claim 1 wherein a plurality of tine-mounting means are secured about the periphery of a base portion of said drum; said crop-engaging elements comprising a plurality of tines received by said mounting means and extending outwardly from said drum opposite to the direction of rotation of said drum; and said tine-mounting means being adjustably mounted for effecting a change in the angle of extension of said tines relative to said drum.

3. The machine of claim 2 wherein each tine is integral and comprises two arms joined by a coiled spring means; said drum containing openings receiving each arm; and each tine-mounting means including a housing mounted on the inside wall of said drum and receiving and completely confining said spring means.

4. The machine of claim 1 further comprising a beam extending in the direction of travel having its forward end vertically pivotally connected to said unit for movement about a first transverse axis and having its rearward end vertically pivotally connected to said frame defining the top of said grouper; means coupled between the unit and the beam for swinging the beam vertically so as to move the grouper between operative and inoperative positions; and further means coupled between the grouper and beam for pivoting said grouper relative to said beam to vary the axis of rotation of said grouper in an operative position.

5. The machine of claim 4 wherein said drive means includes a motor fixed to said frame defining the top of said grouper and coupled for driving said drum.

6. In a crop harvesting machine including a unit supported on a pair of laterally spaced ground wheels and being operable for moving through a field, cutting a standing crop, propelling said crop rearwardly and guiding said crop inwardly to a relatively narrow discharge outlet at the rear of the unit and further including a windrow grouper mounted to said unit and including a side conveyor located for intercepting the discharged crop before it hits the ground and operable for delivering the crop sidewise to join a windrow located outwardly of one of the ground wheels and previously formed by the unit when the grouper was not in a crop-intercepting position, the improvement comprising: said side conveyor being in the form of a drum mounted for spinning about an upwardly extending axis, having a major transverse dimension approximating that of said discharge outlet and having an exterior surface located to intercept crop being delivered through said discharge outlet; and drive means coupled to said drum for spinning the latter whereby the crop intercepted by the drum may be deflected and impelled to a location toward one side of the unit for joining said windrow located outwardly of said one of the ground wheels.

7. The crop harvesting machine defined in claim 6 wherein said drum carries crop aggressive members on a lower end thereof.

8. The crop harvesting machine defined in claim 7 wherein the crop aggressive members are in the form of a plurality of tines.

* * * * *